I. V. BROWER.
Corn Harvester.
No. 33,026. Patented Aug. 13, 1861.
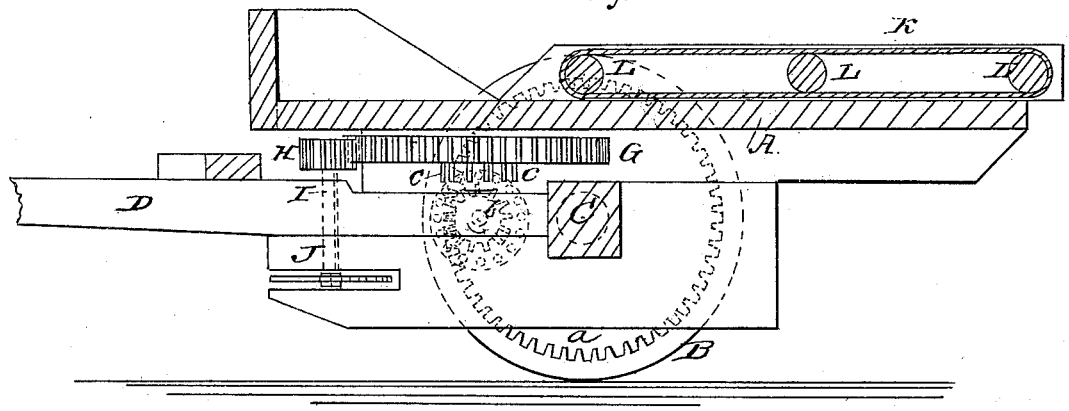
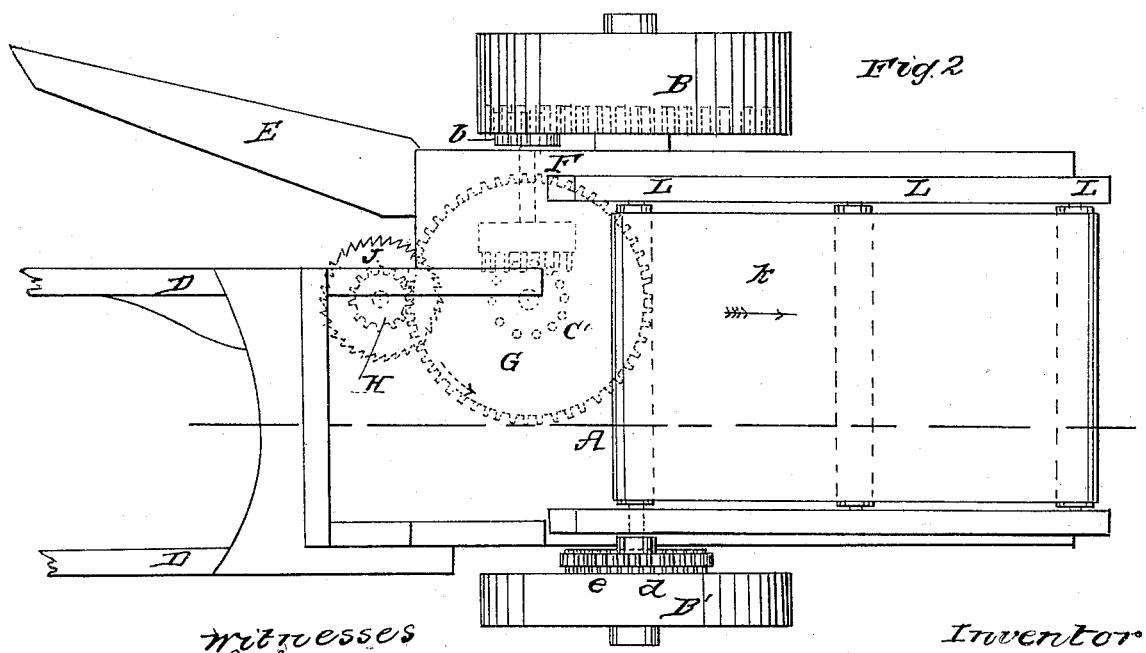

UNITED STATES PATENT OFFICE.

ISAAC V. BROWER, OF MILLSTONE, NEW JERSEY.

IMPROVEMENT IN CORN-HARVESTERS.

Specification forming part of Letters Patent No. 33,026, dated August 13, 1861.

*To all whom it may concern:*

Be it known that I, ISAAC V. BROWER, of Millstone, in the county of Somerset and State of New Jersey, have invented a new and Improved Machine for Harvesting Standing Maize or Indian Corn; and I do hereby declare that the following is a full, clear, and exact description of the same, reference being had to the annexed drawings, making a part of this specification, in which—

Figure 1 is a side sectional view of my invention, taken in the line x x, Fig. 2; Fig. 2, a plan or top view of the same.

Similar letters of reference indicate corresponding parts in the two figures.

The leading object of this invention is to provide a machine upon which the attendant can ride, and conveniently grasp the top of the stalks of corn as they are being severed by the cutter, and drop the same upon a gaveling-apron, and thus dispense with the mechanism usually employed for guiding the cut crop from the cutters to the delivering or gaveling apparatus; and the invention consists in the arrangement of the mechanism, as hereinafter described.

To enable those skilled in the art to fully understand and construct my invention, I will proceed to describe it.

A represents a platform constituting the main frame of the machine, which may be constructed in any suitable manner of quadrilateral form, and mounted on two wheels, B B', said wheels being placed loosely on their axle C, which is permanently attached to the frame A.

D D represent thills, which are attached to the frame A, and E is a bar which is attached to the front end of frame A, obliquely with the thills, as shown in Fig. 2, said bar projecting out laterally from the thills from its inner to its outer end.

The wheel B has an internal gear, a, at its inner side, into which a pinion, b, on a shaft, F, gears, said shaft F being fitted in proper bearings beneath frame A, and having a pinion, c, on its inner end, which pinion gears into a pinion, c', on the shaft of spur-wheel G, the latter gearing into a pinion, H, which is on a vertical shaft, I, said shaft having a cutter, J, at its lower end. The cutter J may be toothed like a circular saw; or other forms of cutters which will cut by a rotary motion may be used. The cutter J is placed at the back part of bar E, between it and the thills D D, as shown clearly in Fig. 2.

On the frame A there is placed an endless apron, K. This apron is fitted on rollers L, the front one of which has a toothed wheel, d, at one end, said wheel gearing into a pinion, e, which is attached concentrically to the wheel B'.

The operation is as follows: As the machine is drawn along, the cutter J is rotated from wheel B through the medium of the gearing described, said cutter moving directly over a row of corn, so that the hills will enter between the bar E and the hills D D. As the stalks are cut, they are grasped by the attendant standing on the platform A, and laid upon the endless apron K, which by means of the gearing previously described in connection with wheel B' is moved in the direction indicated by the arrow, and is discharged on the ground from the back end of machine. Thus it will be seen that the cutter J is operated from one wheel, B, and the endless discharging-apron from the other wheel, B', and all side draft therefore avoided, while a very compact and light machine is obtained.

My object has been to produce a machine of effective and simple construction and light draft, and adapted to carry an operator, who, taking hill after hill of stalks, as they are severed by the cutters, can deposit a number such on the slowly-moving apron before the gavel gets beyond his reach, after which they are deposited by the apron on the ground.

Having thus described my invention, what I claim as new, and desire to secure by Letters Patent, is—

The arrangement of the gaveling or endless apron K, with its gearing, and the cutter with its gearing, in relation to each other and to the stand or platform for the attendant, substantially in the manner and for the purposes specified.

ISAAC V. BROWER.

Witnesses:
H. S. BROWER,
WILLIAM HULD.